United States Patent
Ogushwitz et al.

[11] Patent Number: 5,235,559
[45] Date of Patent: Aug. 10, 1993

[54] METHOD AND APPARATUS FOR DETERMINING BEDLOAD THICKNESS EMPLOYING STANDING WAVE MEASUREMENTS

[76] Inventors: Paul R. Ogushwitz, 76 Cedar Lake West, Denville, N.J. 07834; Howard L. Ogushwitz, 19 Storrs Heights Rd., Storrs, Conn. 06268

[21] Appl. No.: 891,266
[22] Filed: Jun. 1, 1992
[51] Int. Cl.⁵ ............................................. G01S 15/00
[52] U.S. Cl. ................................... 367/99; 367/908; 367/104; 367/15
[58] Field of Search ................ 367/99, 908, 15, 104; 340/612, 621

[56] References Cited

U.S. PATENT DOCUMENTS

| | | | |
|---|---|---|---|
| 2,684,724 | 7/1954 | Kock | 367/151 |
| 2,684,725 | 7/1954 | Kock | 181/176 |
| 2,819,771 | 1/1958 | Kock | 367/153 |
| 4,924,449 | 5/1990 | Guigne | 367/104 |

*Primary Examiner*—Daniel T. Pihulic
*Attorney, Agent, or Firm*—Luther A. Marsh

[57] ABSTRACT

The invention generally pertains to apparatus for determining bedload thickness of a bedload on a bed surface in an aquatic medium. An acoustic source is operative when energized for producing incident acoustic waves in the medium directed at the bed surface resulting in reflected waves. An acoustic sensor is movably locatable between the acoustic source and the bed surface and is responsive to the incident and reflected waves for producing a variable output representative of the sum of the incident and reflected waves. The sum varies between a maximum and a minimum with distance from the bed surface. A height sensor is responsive to the position of the acoustic sensor relative to the bedload thickness for producing an output indicative thereof. A processor responsive to the acoustic sensor output and the height sensor output produces an output indicative of the thickness of the bedload thickness. A method for determining bedload thickness is disclosed as well as a model for simulating the bedload in a non-aquatic medium.

18 Claims, 2 Drawing Sheets

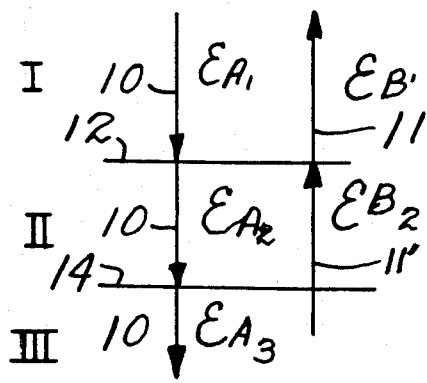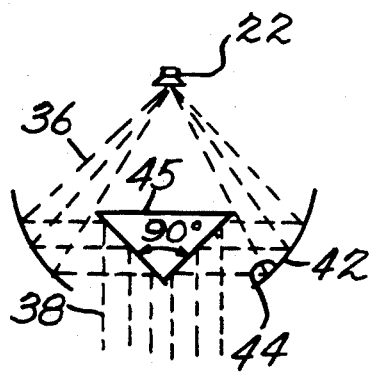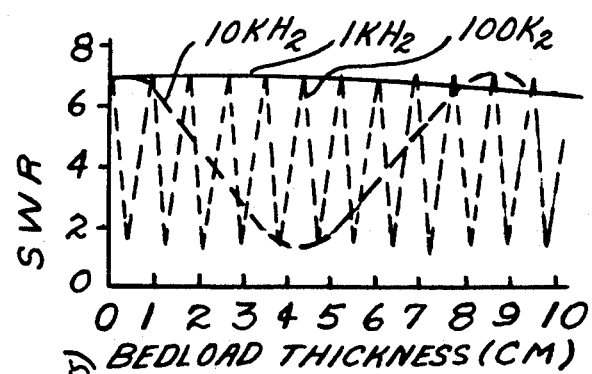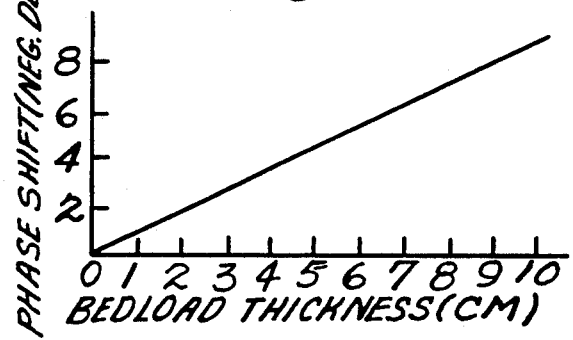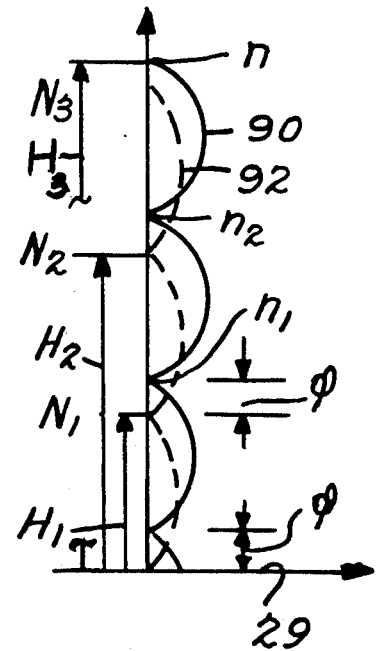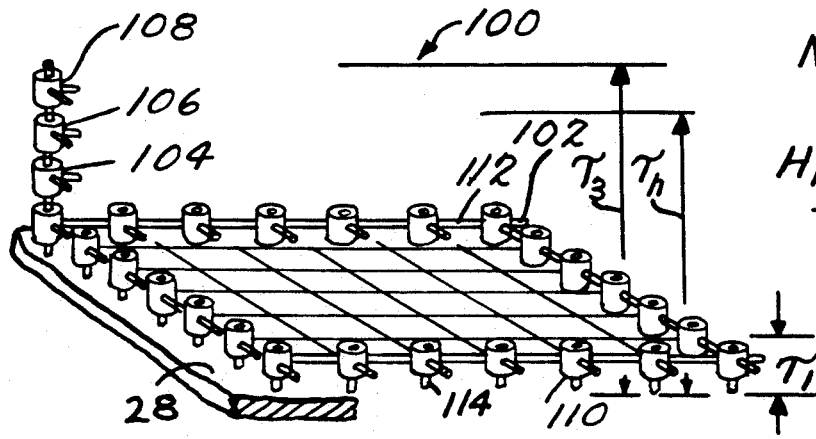

METHOD AND APPARATUS FOR DETERMINING BEDLOAD THICKNESS EMPLOYING STANDING WAVE MEASUREMENTS

BACKGROUND OF THE INVENTION

The invention pertains to a method and apparatus for measuring bedload properties and in particular to methods and apparatus for determining the bedload thickness employing standing wave measurements.

Sediment transport nearshore has been the subject of extensive studies. Known measurement techniques are not sufficiently precise, by at least an order of magnitude, to achieve engineering and scientific objectives. See for example a report by Allen entitled Nearshore Sediment Transport, Geographical Review, 78: 148-157 (1988).

Mass transport is the product of mass (M) times velocity (V) of sediments. The accurate measurement of sediment thickness ($\tau$) is a first step towards characterizing mass transport. While the transport velocity field may be measured by other means, it is necessary to determine the total mass of the moving sediment. The total mass is a function $\phi$ bedload thickness, porosity, and density.

SUMMARY OF THE INVENTION

The invention is directed to a method and apparatus for accurately determining bedload or sediment thickness employing acoustical standing waves. In particular, the invention comprises directing incident acoustic waves at the bed resulting in reflected acoustic waves and measuring the location relative to the bed where the sum of the incident and reflected acoustic waves is a minimum. This position is a measure of the bed thickness. Alternatively the standing wave ratio of the incident and reflected acoustic waves may be calculated from reflection data and known sediment profiles to determine thickness.

A model has been made to simulate the acoustic properties of sediments in air so as to infer bed thickness from corresponding subaqueous measurements.

In the embodiment the invention is directed to apparatus for determining bedload thickness on a bed surface in an aquatic medium. An acoustic source directed at the bed surface is operative when energized for producing incident acoustic waves in the medium resulting in reflected waves therefrom. An acoustic sensor movably locatable between the acoustic source and the bed surface is responsive to the incident and reflected waves for producing a variable output representative of the sum of the incident and reflected waves, which sum alternates between maxima and minima with distance from the bed surface. A height sensor is responsive to the position of the acoustic sensor relative to the bed surface for producing an output indicative thereof, and processing means is responsive to the acoustic sensor output and the height sensor output for producing an output indicative of the thickness of the bed surface.

In another embodiment, the invention is directed to a method for determining bedload thickness on a bed surface in an aquatic medium. The source of acoustic waves is directed at the bed surface for producing incident and reflected acoustic waves. The sum of the incident and the reflected waves in the medium is sensed between a maximum and a minimum as a function of the distance to the bed surface; and the bedload thickness is determined as a function of the standing wave ratio of the incident and reflected acoustic waves or the difference between the height of the minimum with and without a bedload.

DESCRIPTION OF THE DRAWINGS

FIG. 1 is a general illustration of various acoustic wave transmission media which are used in a mathematical explanation of the principles governing the present invention;

FIG. 3 is an illustration of an acoustic lens for converting spherical acoustic waves into a plane acoustic wave field;

FIG. 4 is a graphical representation of a sensor output versus height above the bed in the illustration of FIG. 2;

FIG. 5 is a schematic representation of a model employed to characterize the properties of the bedload in air in order to enable evaluation of the bedload properties in an aquatic environment.

FIG. 6 is a graphical representation of bedload thickness versus standing wave ratio for various acoustic wave inputs at different frequencies; and FIG. 7 is a graphical representation of bedload thickness versus phase shift of the acoustic waves.

DETAILED DESCRIPTION OF THE INVENTION

Figure 2:
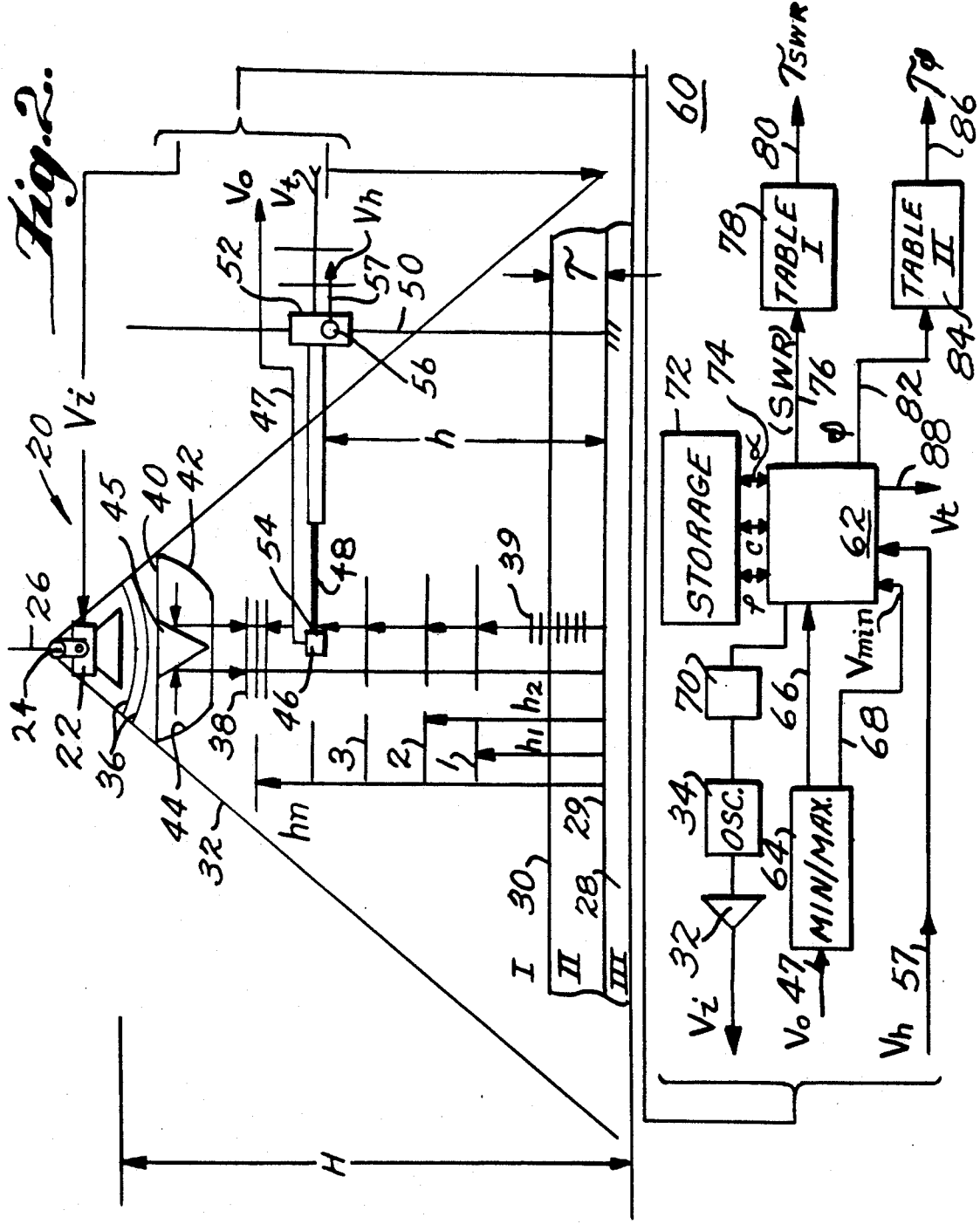
FIG. 2 is a schematic diagram illustrating an apparatus for detecting bedload thickness utilizing acoustic standing waves.

Before describing the invention in detail, a brief theoretical discussion of sediment properties is set forth below. To properly characterize mass transport of sediments, let $\tau$ be the thickness of the bedload, let $\rho^{av}$ and $\beta^{av}$ be the average bulk density and average porosity of the bedload, respectively. The total mass of bedload per unit area (M) is then approximately $$M = \tau \rho^{av}(1-\beta^{av}), \qquad (1)$$

and the vector, mass transport per unit area (T) is given by $$T = MU \qquad (2)$$

where U is the transport velocity vector. The problem is to measure the parameters $\tau$, $\rho^{av}$, and $\beta^{av}$. The following discussion deals exclusively with the measurement of thickness.

Referring to FIG. 1, consider the transmission and reflection of respective acoustic plane waves 10 and 11 of frequency $\omega$ in three adjacent media, labelled I, II, III. In an experimental arrangement, medium I is air, medium II is a test material, and medium III is a rigid reflector. In a corresponding underwater system, medium I is water, medium II is the bedload and medium III is the underlying stationary material. Let the boundaries 12 and 14 between media I and II and between III and IV respectively be parallel, and further assume that the plane waves 10 strike the boundaries at normal incidence. Let $\rho_j$, $c_j$ and $\alpha_j$ be density, sound speed, and intrinsic absorption respectively, where the subscript j=1,2,3 represents the medium. Absorption is included in these derivations because it is anticipated that the underwater system might operate at high frequencies where absorptive effects in the bedload may be significant. Assume $\rho_j$, $c_j$, and $\alpha_j$ are constants, with $\alpha_1=0$. Note that the wavenumbers in the respective media are given by $K_j=\omega/c_j$ and $\theta_i=\rho_i c_i 2$. It is also convenient to define the identity $\gamma_j \equiv \alpha + i\kappa_j$. Let $\tau$ be the thickness of medium II.

It is desirable to make measurements on the standing wave pattern in medium I, for example air or relatively uncontaminated water. The standing wave patterns are produced when the reflected wave 11 interferes with the incident wave 10. A known complex reflection coefficient $\mathfrak{R}$ at the boundary between medium I and medium II may be expressed following Lindsay, *Mechanical Radiation*, (1960) as follows:

$$\mathfrak{R} = \frac{(F_1 - F_2)(F_2 + F_3)e^{+i\gamma 2\tau} + (F_1 + F_2)(F_2 - F_3)e^{-i\gamma 2\tau}}{(F_1 + F_2)(F_2 + F_3)e^{+i\gamma 2\tau} + (F_1 - F_2)(F_2 - F_3)e^{-i\gamma 2\tau}} \quad (3)$$

Here, the complex coefficients $F_j \equiv \theta_j \gamma_j$, where $j = 1,2,3$ are function of the densities, sound speeds, and absorption in the tree media, respectively. For simplicity, the complete derivation is not presented here but is given in Ogushwitz and Ogushwitz, *Standing Wave Measurements of Bedload Thickness I. Feasibility in an Air System with Model Sediment*, U.S. Corp. of Engineers Waterway Experiment Station Vicksburg, Miss. 39180, Final Report, 18 October 1990.

The complex reflection coefficient at the reflector, (i.e., at the I-II boundary) also can be expressed as described by Beranek (*Acoustical Measurements*, Acoustical Society of America, 1988):

$$\mathfrak{R} = |\mathfrak{R}|e^{i\phi} = e^{-2(\phi_1 + i\phi_2)} \quad (4)$$

where $|\mathfrak{R}|$ and $\phi$ its magnitude and phase, respectively. It follows that $$\phi_1 = -\frac{1}{2} \ln(|\mathfrak{R}|) \quad (5)$$

and $$\phi_2 = -\frac{1}{2} \phi \quad (6)$$

The excess pressure in the medium I at a distance Z about the I-II boundary is given by $$|P(z)| = C[\sin h^2(\alpha_1 z + \phi_1) + \cos^2(\kappa_1 z + \phi_2)]^{\frac{1}{2}} \quad (7)$$

where C is a complex constant.

The behavior of equation (7) is discussed in Beranek (1988). For small values $\alpha_1$, maximum value $p_{max} = C \cos h\phi_1$ occur when $\cos^2(\kappa_1 z + \phi_2) = 1$, and minimum values $p_{min} = C \sin h\phi_1$ occur at position $z_n$ such that $\cos^2(\kappa_1 z_n + \phi_2) = 0$, i.e., $$\phi_2 = -\kappa_1 z_n + (2n+1)\frac{\pi}{2}, \quad (8)$$

wherein n is an integer. From equations (6) and (8), the following expression is obtained:

$$\phi = -2\phi_2 = 2\kappa_1 z_n - (2n+1)\pi. \quad (9)$$

Let $p_{max}$ and $p_{min}$ be the maximum and minimum values of the excess pressure P(z), respectively. Then from the definition of the standing wave ratio (SWR) S, and the definition of the hyperbolic cotangent, the following expression is obtained $$S = \frac{p_{max}}{p_{min}} = \coth\phi_1 = \frac{1 + e^{-2\phi_1}}{1 - e^{-2\phi_1}} = \frac{1 + |\mathfrak{R}|}{1 - |\mathfrak{R}|}, \quad (10)$$

this leads directly to:

$$|\mathfrak{R}| = \frac{1 - S}{1 + S}. \quad (11)$$

Thus, the complex reflection coefficient can be determined from measurements of $z_n$ and S.

To summarize, the SWR and the phase shift $\phi$ of the standing wave field are functions of the complex reflection coefficient at the I-II boundary. The reflection coefficient, in turn, is a function of the quantities $\tau, p_j, c_j,$ and $\alpha_j$. In an experimental configuration these quantities are known or given. Therefore, an estimate of the phase shift and SWR as a function of thickness may be made.

An exemplary apparatus 20 for carrying out the invention is depicted in FIGS. 2–3. An acoustic source 22 is mounted on an aimable polar axis assembly 24 which allows the source 22 to be positioned along a vertical axis 26. The axis 26 is normal to a bed 28 which supports a bedload 30 of thickness $\tau$ on its upper surface 29. The acoustic source 22 may be a loud speaker for air applications or a sonar transducer for aquatic applications. The source 22 is supported by the polar axis assembly 24 atop a tripod 32 which supports the acoustic source at a known fixed height H. The acoustic source 22 may be operated by an input signal $V_i$ at a constant frequency via a wide bandwidth amplifier 32 driven by an oscillator 34.

The source 22 produces spherical sonic waves 36 which are converted to incident plane waves 38 by means of an acoustic lens 40 located on the axis 26 as illustrated. The acoustic lens 40 includes a cylindrical nacelle 42 in having a reflective surface 44 in the form of a section of a parabola. The acoustic lens 40 also includes a conical reflector 45 for redirecting the spherical waves 36 which are converted to planar waves 38 downwardly as shown in FIGS. 2 and 3.

An omnidirectional electret microphone 46 having a small aperture on the order 0.8 centimeters and a relatively flat frequency response down to about 300 hz is located along the vertical axis 26. The sensor 46 produces an output voltage V· on line 47. It is supported by a relatively thin horizontal support arm 48 coupled to a vertical support 50 by means of a trolley 52. The trolley 52 carries a height sensor 56 which produces an output $V_h$ on line 57 indicative of the height h of the sensor 46 from the bedload surface 29, as illustrated. The microphone 46 may be coupled to the support on 48 by means of a swivel coupling 54 in order to allow the microphone to be precisely positioned below acoustic lens 40 as illustrated. The support on 48 may also be telescopic for further precision in positioning the microphone 46. The trolley 52 may be operated manually, motor driven, or servo-controlled.

An electronic circuit 60 is remotely located from the sensor 46 as illustrated. The electronic circuit 60 includes the amplifier 32 and oscillator 34 previously noted and further includes a central processing unit CPU 62. The CPU 62 controls the oscillator 34 by means of a driver circuit 70 in a known manner. The CPU receives $V_h$ line 57 from the height sensor 56 and receives the sensor 46 output V· via lead 47 through a min/max detector 64. The detector 64 produces an output $|V^*|$ indicative of the absolute value of the microphone response on line 66. The detector 64 also produces an output $V_{min}$ on line 68 when the microphone output is a minimum or at a null value. In addition, CPU 62 is responsive to the height sensor output $V_h$ on line 57. An output 88 of the CPU 62 may be used to position the trolley via appropriate feedback from the height sensor 56. In accordance with the invention, certain parameters $\rho$, c, and $\alpha$ are stored in a storage device 72 which may be a look up table, a random access memory, a disk drive or the like. The CPU 62, in response to the microphone 46 output and the height sensor output calculates one indication of the bedload thickness $\tau$. In one embodiment the CPU produces an output which represents the standing wave ratio (SWR) on line 76. The SWR signal is coupled to Table I 78 which produces an output $T_{SWR}$ on line 80 is indicative of the thickness of the bedload. Alternatively, the CPU 62 produces an output $\phi$ on line 82 which is indicative of the phase between the incident sonic plane wave 38 and the reflected sonic plane wave 39. This phase difference in phase is an indicator of bedload thickness. Values of bedload thickness in terms of the phase shift $\phi$ are stored in Table II 84 which produces an output $\tau_\phi$ on line 86.

In accordance with the invention the incident acoustic wave 38 passes through each of the media I, II and III. In a preferred embodiment the sonic or acoustic waves 38 are transmitted through medium I which is water. A portion of the incident wave 38 passes through the bedload 30 which represents an acoustic impedance. When the wave 38 encounters the surface 29 of the bed 28 a portion of the signal is reflected back as reflected wave 39. The incident and reflected waves 38 and 39 interfere with each other causing positive and negative reinforcement which results in various null points 1, 2, 3, ... and at certain locations $h_1, h_2 ... h_n$ respectively above the surface 29 and the bed 28.

FIG. 4 illustrates exemplary waveforms 90 and 92 of interference resulting patterns in presence the bedload 30 and without the bedload 30 respectively. When the bedload 30 is present the incident and reflected acoustic waves 38 and 39 produce an interference pattern 92 which establishes null points $N_1, N_2 ... N_n$ as illustrated. The null points are at respective heights $H_1, H_2 ... H_n$ above the bedload surface 29.

In the presence of a bedload 30 the resulting waveform 90 is phase shifted upwardly by an amount $\phi$ as illustrated. The corresponding null points $n_1, n_2$ n are phase shifted by the amount $\phi$. In accordance with the prior theoretical explanation, the phase shift $\phi$ can be correlated with the bedload 30 thickness $\tau$ as long as certain parameters concerning the properties of the bedload and the actual location of the bedload surface 29 are known.

In accordance with the invention an experimental apparatus is described which has been found to be useful in characterizing the response and parameters associated with the bedload 30. The particular model employed is designed to represent the bedload 30 in an air medium. That is to say, a model of the bedload or sediment 30 requires sufficient acoustical transparency for a signal to penetrate the model and reach an appropriately reflective bed. Initial modeling with fine and course sand resulted in an acoustic contrast between the sand and the overlying air layer which was too large to allow a detectable phase shift. Similarly, sound absorbing materials produced unacceptable results.

In accordance with the invention, an obstacle array 100, illustrated in FIG. 5, was constructed to simulate a model sediment in the air system. The model sediment comprises one or more individual layers 102-108 formed of individual cylinders 110 arranged in a matrix or grid interconnected by cylindrical dowels 112. In addition the individual cylinders 110 are supported in the vertical direction by dowels 114. The array 100 rests on a reflective base member 28 such as a steel plate. The cylinders 110 and the dowels 112 and 114 are preferably formed of wood. By adding additional layers 104-108 etc. to the array 100, various bedload thicknesses $\tau_1, \tau_2, \tau_3 ... \tau_n$ are simulated by the model.

In accordance with an exemplary embodiment of the invention, the nominal thickness of the array 100 is defined as the height from the base 28 to the top of the cylinders 110. From known dimensions of the cylinders 110 and dowels 112-114 an effective index of refraction $n \approx 1.16$ was established. Particular equipment useful in the present invention is set forth in greater detail in Ogushwitz and Ogushwitz (1990) referred to herein above.

When a fluid moves past an array of cylinders 110 its initial density $\rho_0$ appears to increase to a value:

$$\rho = \rho_0 + \frac{1}{2} NV\rho_0 \qquad (12)$$

where V is the volume of one cylinder and N is the number of cylinders per unit volume. Because the speed of sound in a medium is inversely proportional to the square root of the density of the medium, the index of refraction n of the medium is defined by:

$$n = \frac{c_0}{c} = \left[\frac{\rho}{\rho_0}\right]^{\frac{1}{2}} = \left[1 + \frac{1}{2} NV\right]^{\frac{1}{2}} \qquad (13)$$

where n is index of refraction, $c_\cdot$ is the original sound speed in the free medium (e.g., air) and c is the speed of sound modified by the obstacle array 100. Equation (13) is a satisfactory derivation when the separation between the cylinders 110 is sufficiently large that no individual element distorts the sound field acting on the neighboring elements. The distortion incurs when the value of n exceeds approximately 1.2. An obstacle array of the type employed to model sediment is illustrated in Kock et al. *Refracting Sound Waves*, J. Accoust. Soc. of Amer., 21:471-481 (1949). See also Kock U.S. Pat. Nos. 2,684,724; 2,864,725; and 2,819,771.

Because the total volume occupied by N spheres per unit volume is NV, the total volume occupied by air per unit volume is 1-NV. Therefore, porosity, which is given by the volume of fluid per unit volume, is: $\beta=1-NV$. From equation (13) then, $$\beta = 3 - 2n^2 \qquad (14)$$

The exemplary cylinders 112 forming the array 100 have a diameter of about 33.3 mm and height of about 25.4 mm. The dowels 112 have a diameter of about 4.75 to 6.35 mm. Each layer had a nominal thickness t of approximately $6.6 \text{ cm} < \tau < 10.2 \text{ cm}$. The resulting array 110 had an effective porosity $\beta$ approximately equal to 0.31 which lies within the range of porosity characterizing pure sand which are set forth in Stoll, *Theoretical*

*Aspects of Sound Transmission in Sediments.* J. Accoust. Soc. of Amer. 68:1341-1350 (1980).

In order to infer bedload thickness $\tau$ from field measurements of SWR and phase shift $\phi$ under water, it is necessary to independently measure or estimate the properties $\rho_j$, $c_j$, and $\alpha_j$ where j=1,2,3 (Equation 3). The properties of sea water are well known. See Urick, *Principles of Under Water Sound* McGraw-Hill Book Co. NY (1975). While the theoretical basis suggests that standing wave techniques may be used to measure some sediment properties in addition to bedload thickens $\tau$, the present invention is primarily concerned with particular values of SWR and phase shift $\phi$ which will be required for underwater measurements of bedload thickness.

In order to gauge the applicability of standing wave techniques herein described to measurement of bedload thickness $\tau$, model parameters that are representative of sea water, bedload, and a non-moving bottom were employed. A bedload was modeled as a brine-saturated sand having a porosity of 0.39, a grain density of 2.65 gm/cm$^3$ and non-moving sediment as a porous sandstone having a porosity of 0.16, and a grain density of 2.65 gm/cm$^3$. Sound speeds in these materials were estimated from the Biot theory set forth in Ogushwitz, *Applicability of the Biot Theory, I. Low Porosity Materials.* J. Accoust. Soc. of Amer. 77. 429-440 (1985). Relative physical properties are given in the table below:

| | Physical Quantities Used in the Modeling | | | |
|---|---|---|---|---|
| Material | $\rho$ (gm/cm$^3$) | c (cm/sec) | $\theta$ (dyne/cm$^2$) | $\alpha$ (neper/m) |
| Air | $1.29 \times 10^{-3}$ | $3.314 \times 10^4$ | $1.42 \times 10^6$ | 0. |
| Wood | 0.55 | $4.0 \times 10^5$ | $8.8 \times 10^{10}$ | 0. |
| Steel | 7.8 | $5.94 \times 10^5$ | $2.75 \times 10^{12}$ | 0. |
| Water | 1.03 | $1.50 \times 10^5$ | $2.32 \times 10^{10}$ | 0. |
| Water + Sand | 2.02 | $1.70 \times 10^5$ | $5.84 \times 10^{10}$ | 0. |
| Sandstone | 2.22 | $4.00 \times 10^5$ | $4.20 \times 10^{11}$ | 0. |

Estimates of SWR and phase shift $\phi$ as a function of bedload thickness were performed for three frequencies namely 1 KHz, 10 KHz and 100 KHz. The estimates are plotted in FIG. 6 as a composite. Also, the estimated phase shift is a function of bedload thickness in a water sand system at 1 KHz as illustrated in FIG. 7.

In FIG. 6 it can be seen that the maximum value of SWR is about 7.2 at all frequencies and a minimum value is about 1.3. In accordance with the invention it is desirable to operate at a relatively low frequency near about 1 KHz in order to maintain a uniform value of SWR over the desired range of measurement. The periodicity of FIG. 6 can be understood by examining equation (3) above where the thickness appears only in the arguments of the exponential term $e^{\pm\gamma 2\tau}$. Thus the value of $\Re$ recurs at values $T_n$ such that $\gamma_2\tau = \gamma_2\tau + 2\pi n$ for integer values of n.

The wavelength of sound is seawater at 1 KHz is about 150 cm. If it is assumed that an interference mode can be located underwater with a repeatability comparable to that of an air system (i.e., 0.1 cm), then a phase shift of 0.24 degrees should be resolvable, corresponding to a bedload thickness of 0.28 centimeters as illustrated in FIG. 7.

It should be understood that the estimated phase shift illustrated by the solid line in FIG. 7 occurs at about 1 KHz. The estimated phase shift for higher frequencies varies from the relatively linear curve of FIG. 7. This occurs because the SWR varies with frequency as illustrated in FIG. 6.

In accordance with the present invention, it has been found that a reproducible standing wave pattern may be produced in an air system with nodal positions measured to a precision of about 1 mm. Using such a standing wave pattern, the thickness of a model sediment has been established. Likewise the feasibility of standing wave measurements to determine bedload thickness in an underwater system has been established with a theoretical precision about 2.8 mm. or better with an operating frequency of about 1 KHz. Finally the obstacle array has been used to successfully model sediment in an air system, the physical properties thereof being analogous to the properties of water and a saturated sand water bedload.

What is claimed is:

1. Apparatus for determining bedload thickness of a bedload on a bed surface in an aquatic medium comprising:

an acoustic source operative when energized for producing incident acoustic waves in the medium directed at the bed surface resulting in reflected waves therefrom;

an acoustic sensor movably located between the acoustic source and the bed surface and responsive to the incident and reflected waves for producing a variable output representative of the sum of incident and reflected waves, which sum varies between at least one maximum and at least one minimum with distance from the bed surface;

a height sensor responsive to the position of the acoustic sensor relative to the bed surface for producing an output indicative thereof;

processing means responsive to the acoustic sensor output and the height sensor output for producing an output indicative of the thickness of the bed surface.

2. Apparatus according to claim 1, wherein the output of the processing is a measure of a standing wave ratio between the incident and reflected acoustic signals.

3. Apparatus according to claim 1, wherein the minimum represents a nodal point or point of maximum interference between the incident and the reflected acoustic waves and the phase shift represents a shift in said nodal point relative to the bed surface with and without a bedload, said phase shift representative of the thickness of said bedload.

4. An apparatus according to claim 1, wherein said processing means includes means responsive to the acoustic sensor output and the height sensor output for producing an output indicative of one such minimum and a corresponding height of the sensor.

5. The apparatus according to claim 1, further including acoustic lens means located between the acoustic source and the bed surface being responsive to the acoustic waves for producing planar incident acoustic waves.

6. Apparatus according to claim 5, wherein lens comprises a parabolic surface.

7. An apparatus according to claim 5, wherein the acoustic lens further includes a deflector for directing planar acoustic waves from the parabolic surface at the bed.

8. An apparatus according to claim 1, wherein the acoustic wave has a frequency of about 1 kilohertz.

9. Apparatus according to claim 1, including modeling means for representing the bedload in a non-aquatic medium.

10. Apparatus according to claim 9, wherein said modeling means comprises an obstacle array including a plurality of uniform objects located at spaced intervals and fixedly interconnected in a uniform array.

11. The apparatus according to claim 9, wherein the obstacle array comprises cylindrical objects interconnected by cylindrical dowels.

12. Apparatus according to claim 1, wherein said processing means comprises a CPU having a plurality of inputs representative of physical parameters of the bedload and storage means for storing at least one table representative of the standing wave ratio vs. the corresponding bedload thickness and the phase shift of the mode vs. bedload thickness.

13. A method for determining bedload thickness of a bedload on a bed surface in an aquatic medium comprising the steps of:
    directing a source of acoustic waves at the bed surface producing incident in reflected acoustic waves;
    sensing the sum of the incident and reflected waves in the medium between at least one maximum and online one minimum as a function of the from distance bed surface; and
    determining bedload thickness as a function of at least one of the standing wave ratio of the incident in reflected acoustic waves and a difference between the height of the minimum with and without a bedload.

14. Apparatus for modeling bedload thickness of a bedload on a bed surface in a medium comprising:
    a model for representing the bedload in the medium;
    an acoustic source operative when energized for producing incident acoustic waves in the medium directed at the model bed surface resulting in reflected waves therefrom;
    an acoustic sensor movably located between the acoustic source and the model bed surface and responsive to the incident and reflected waves for producing a variable output representative of the sum of incident and reflected waves, which sum varies between at least one maximum and at least one minimum with distance from the model bed surface;
    a height sensor responsive to the position of the acoustic sensor relative to the model bed surface for producing an output indicative thereof;
    processing means responsive to the acoustic sensor output and the height sensor output for producing an output indicative of the thickness of the model bed surface.

15. Apparatus according to claim 14, wherein said model comprises an obstacle array including a plurality of uniform circular objects located at spaced intervals and fixedly interconnected in a uniform array.

16. The apparatus according to claim 14, wherein the obstacle array comprises cylindrical objects interconnected by cylindrical dowels.

17. Apparatus according to claim 16, wherein the acoustic wave are plane waves generally parallel with the bed and the circular objects comprise cylindrical members arranged in a matrix having central axes perpendicular to the bed.

18. Apparatus according to claim 14, wherein the medium is air.

* * * * *